(12) United States Patent
Uleski

(10) Patent No.: US 6,945,104 B2
(45) Date of Patent: Sep. 20, 2005

(54) ATTACHMENT MECHANISM FOR A TIRE MONITORING SYSTEM

(75) Inventor: Michael A. Uleski, Roseville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/692,872

(22) Filed: Oct. 24, 2003

(65) Prior Publication Data

US 2005/0087006 A1 Apr. 28, 2005

(51) Int. Cl.$^7$ .............................................. B60C 23/02
(52) U.S. Cl. ...................................... 73/146.8; 340/443
(58) Field of Search ................................ 73/146, 146.3, 73/146.2, 146.4, 146.5, 146.8; 340/442, 443; 152/415

(56) References Cited

U.S. PATENT DOCUMENTS

| | | |
|---|---|---|
| 4,157,530 A | 6/1979 | Merz |
| 4,163,208 A | 7/1979 | Merz |
| 4,310,826 A | 1/1982 | D'Angiolillo |
| 4,742,857 A | 5/1988 | Gandhi |
| 4,783,993 A | 11/1988 | Lothar et al. |
| 4,816,802 A | 3/1989 | Doerksen et al. |
| 5,035,137 A | 7/1991 | Burkard et al. |
| 5,063,774 A | 11/1991 | Burkard et al. |
| 5,065,134 A | 11/1991 | Schmid et al. |
| 5,606,123 A | 2/1997 | Rabizadeh |
| 5,717,135 A | 2/1998 | Fiorletta et al. |
| 5,844,131 A * | 12/1998 | Gabelmann et al. ....... 73/146.8 |
| 5,928,444 A * | 7/1999 | Loewe et al. ............... 152/418 |
| 5,975,174 A * | 11/1999 | Loewe ....................... 152/415 |
| 6,055,855 A | 5/2000 | Straub |
| 6,408,913 B1 * | 6/2002 | Caretta et al. .............. 152/415 |
| 6,420,967 B1 | 7/2002 | Ghabra et al. |
| 2002/0101335 A1 | 8/2002 | Ghabra et al. |
| 2002/0168795 A1 | 11/2002 | Schuurmans |
| 2003/0079537 A1 | 5/2003 | Luce |
| 2003/0217595 A1 * | 11/2003 | Banzhof et al. ........... 73/146.8 |
| 2004/0046649 A1 * | 3/2004 | Sanchez et al. ............. 340/443 |

FOREIGN PATENT DOCUMENTS

| | | |
|---|---|---|
| DE | 3906399 A1 | 9/1990 |
| EP | 1340630 A1 | 9/2003 |

* cited by examiner

Primary Examiner—William Oen
Assistant Examiner—Andre Allen
(74) Attorney, Agent, or Firm—Bill C. Panagos

(57) ABSTRACT

A tire pressure monitoring apparatus, for mounting on a vehicle wheel that is configured to have a tire mounted thereon and that has a first opening, includes a tire monitor for sensing pressure in the tire. The tire monitor includes a housing having a spherical surface and a second opening that extends through the spherical surface. A tire valve stem is configured to extend through the first and second openings, and the valve stem has a threaded portion. The apparatus further includes a threaded fastener that is engageable with the threaded portion of the valve stem for attaching together the tire monitor and the valve stem. The fastener has a spherical surface that is engageable with the spherical surface of the housing when the fastener is engaged with the threaded portion of the valve stem.

20 Claims, 2 Drawing Sheets

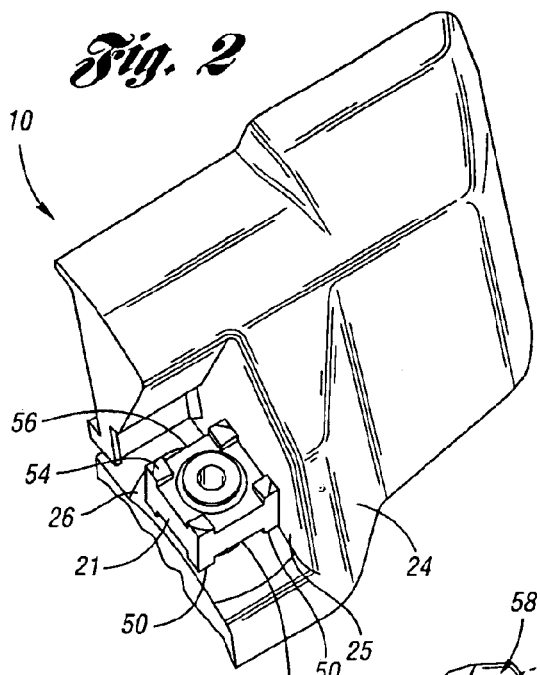
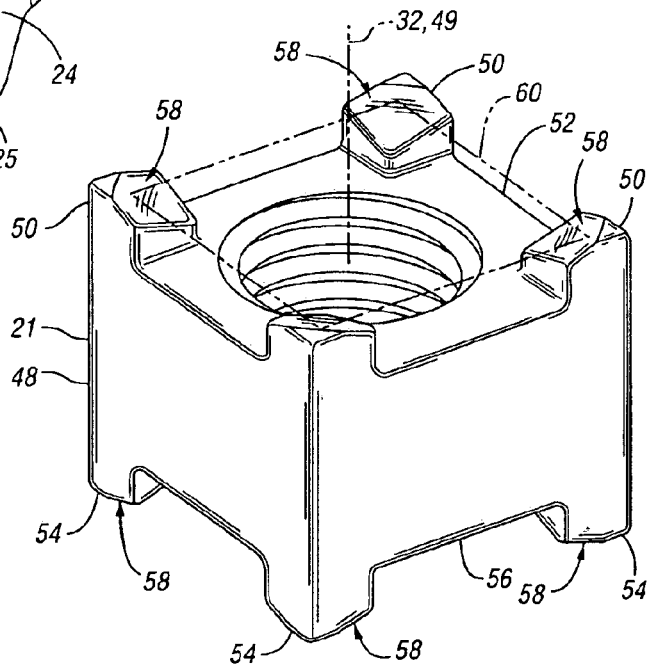
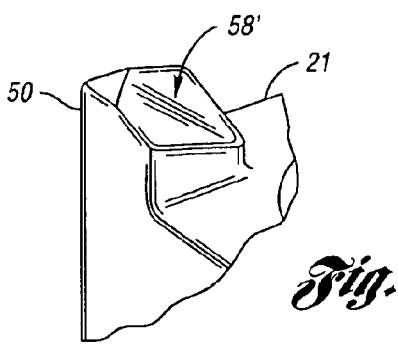
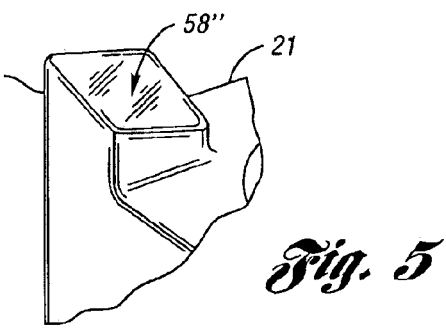

ATTACHMENT MECHANISM FOR A TIRE MONITORING SYSTEM

BACKGROUND OF THE INVENTION

1. Field of the Invention

The invention relates to an attachment mechanism for a tire monitoring system.

2. Background Art

Tire monitoring systems are designed to monitor a tire parameter, such as tire pressure, and may be configured to be attached to a vehicle wheel. Examples of prior attachment mechanisms for use with tire monitoring systems are disclosed in U.S. Pat. Nos. 5,844,131 and 6,055,855.

SUMMARY OF THE INVENTION

Under the invention, a tire monitoring apparatus is provided for mounting on a vehicle wheel that is configured to have a tire mounted thereon, wherein the wheel has a first opening. The apparatus includes a tire monitor for monitoring a tire parameter. The tire monitor includes a housing having a spherical surface and a second opening that extends through the spherical surface. A tire valve stem is configured to extend through the first and second openings, and the valve stem has a threaded portion. The apparatus further includes a threaded fastener that is engageable with the threaded portion of the valve stem for attaching together the tire monitor and the valve stem. The fastener has a spherical surface that is engageable with the spherical surface of the housing when the fastener is engaged with the threaded portion of the valve stem.

Further under the invention, a tire monitoring apparatus is provided for mounting on a vehicle wheel that is configured to have a tire mounted thereon, wherein the wheel has a first opening. The apparatus includes a tire monitor for sensing pressure in the tire. The tire monitor includes a housing having a spherical surface and a second opening that extends through the spherical surface. A tire inflator valve assembly is configured to extend through the first and second openings, and the valve assembly has a longitudinal axis and a threaded portion. The apparatus further includes a threaded fastener that is engageable with the threaded portion of the valve assembly for attaching together the tire monitor and the valve assembly. The fastener includes a base portion having first and second ends. The fastener further includes multiple spaced apart first projections extending from the first end of the base portion, and multiple spaced apart second projections extending from the second end of the base portion. Each projection has a spherical surface. The spherical surfaces of the first projections are configured to provide at least three first points of contact with the spherical surface of the housing when the first end of the base portion of the fastener is facing toward the spherical surface of the housing and the fastener is engaged with the threaded portion of the valve assembly, such that the first points of contact lie generally in a plane that is perpendicular to the axis of the valve assembly. The spherical surfaces of the second projections are configured to provide at least three second points of contact with the spherical surface of the housing when the second end of the base portion of the fastener is facing toward the spherical surface of the housing and the fastener is engaged with the threaded portion of the valve assembly, such that the second points of contact lie generally in a plane that is perpendicular to the axis of the valve assembly.

Still further under the invention, a tire monitoring apparatus is provided for mounting on a vehicle wheel that is configured to have a tire mounted thereon, wherein the wheel has a first opening. The apparatus includes a tire monitor for monitoring a tire parameter, and the tire monitor includes a housing having a spherical surface and a second opening that extends through the spherical surface. A tire valve stem is configured to extend through the first and second openings, and the valve stem has a threaded portion. The apparatus further includes a threaded fastener that is engageable with the threaded portion of the valve stem and the spherical surface of the housing for attaching together the tire monitor and the valve stem. The fastener has a configuration that provides at least three points of contact with the spherical surface of the housing when the fastener is engaged with the spherical surface of the housing.

BRIEF DESCRIPTION OF THE DRAWINGS

FIG. 2 is a perspective view of a portion of the apparatus of FIG. 1 showing a fastener according to the invention disposed in a pocket of a tire monitor housing, wherein the housing is partially broken away to show the fastener;

FIG. 3 is an enlarged perspective view of the fastener of FIG. 2, with the fastener oriented in an opposite direction as compared with FIG. 2 such that an opposite end of the fastener is facing upwardly;

FIG. 4 is a fragmentary perspective view of the fastener showing an alternate engaging surface configuration of the fastener; and FIG. 5 is a fragmentary perspective view of the fastener showing another alternate engaging surface configuration of the fastener.

DETAILED DESCRIPTION OF THE PREFERRED EMBODIMENT(S)

Figure 1:
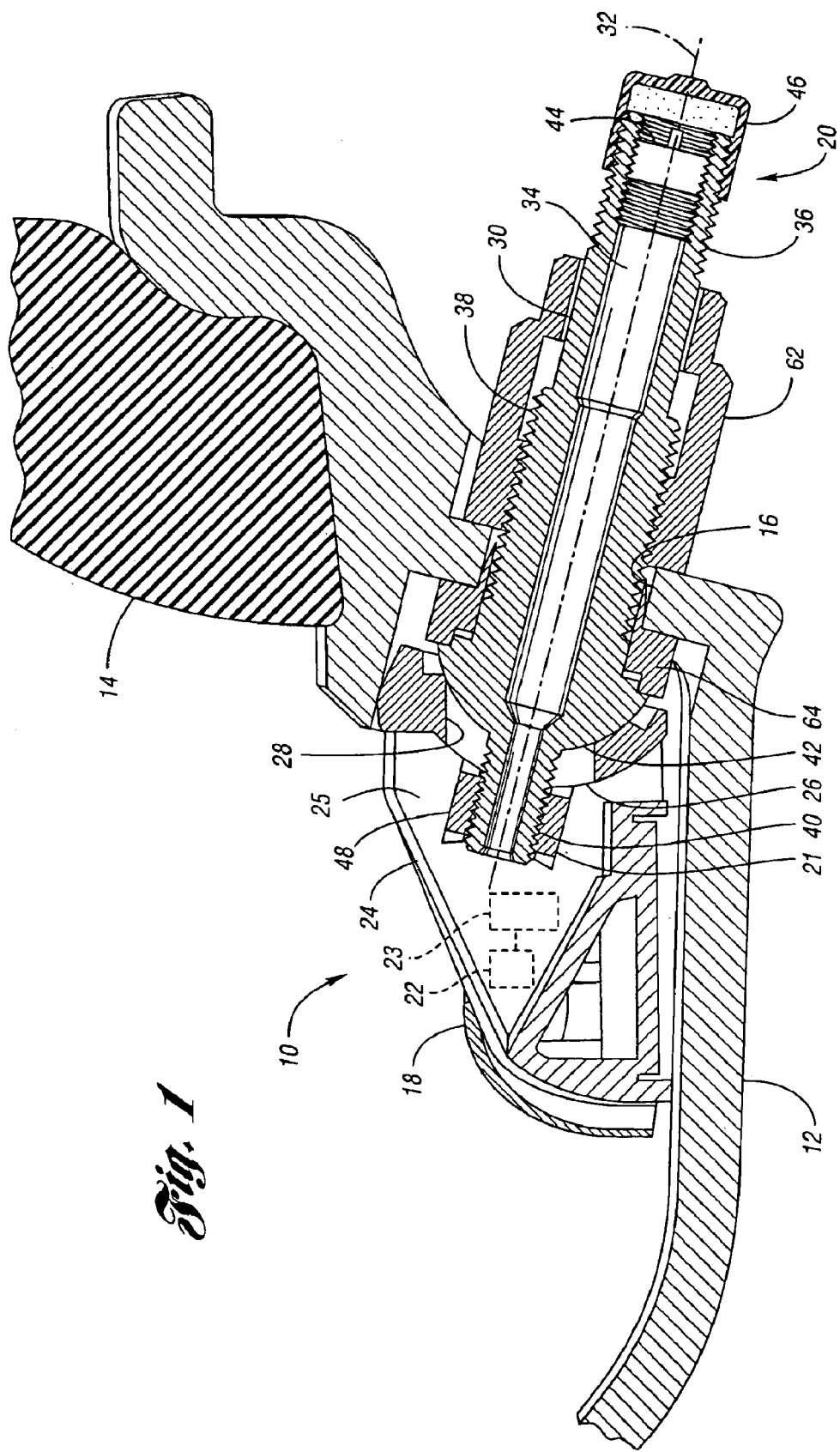
FIG. 1 is a cross-sectional view of a tire monitoring apparatus according to the invention mounted on a wheel of a motor vehicle.

FIG. 1 shows a tire monitoring system or apparatus 10 according to the invention mounted on a vehicle wheel 12 that is configured to have a tire 14 mounted thereon. The apparatus 10 is configured to extend through a first opening 16 in the wheel 12, and includes a tire monitor 18 for monitoring a tire paramater, a tire inflator valve assembly 20 attached to the tire monitor 18, and a threaded fastener 21 engaged with the valve assembly 20 for attaching together the tire monitor 18 and the valve assembly 20.

The tire monitor 18 includes one or more monitoring devices, such as one or more sensors 22, for monitoring one or more tire parameters, such as tire pressure, temperature, location, status (i.e., whether or not the tire 14 is in motion) and/or speed. The tire monitor 18 may also include one or more transmitters 23 in communication with the sensors 22 for transmitting data signals representing information concerning the one or more tire parameters to a receiver (not shown).

For example, the tire monitor 18 may be configured to sense pressure in the tire 14, and provide a signal that is indicative of the sensed pressure to the receiver. If the air pressure in the tire 14 reduces below a predetermined threshold, the tire monitor 18 may provide a signal to the receiver that actuates an alarm, such as a light on a vehicle instrument panel, to apprise a vehicle occupant of the pressure reduction.

The tire monitor 18 includes a housing 24 for receiving the electronic circuitry or other sensing means. The housing 24 defines a pocket 25 for receiving a portion of the valve assembly 20 and the fastener 21. The housing 24 further includes a spherical surface 26 and a second opening 28, such as an elongated slot, that extends through the spherical surface 26.

The valve assembly 20 includes a valve stem 30 having a longitudinal axis 32 and a passage 34 through which air may travel. The valve stem 30 further includes first, second and third threaded portions 36, 38 and 40, respectively, and a spherical surface 42.

The valve assembly 20 further includes a valve 44 disposed in the passage 34 of the valve stem 30, and a dust cap 46 that is engageable with the first threaded portion 36. The valve 44 is configured to allow air to pass into the tire 14, while inhibiting leakage through the passage 34 from the tire 14.

The fastener 21 is engageable with the third threaded portion 40 of the valve stem 30 for attaching together the tire monitor 18 and the valve stem 30. In one embodiment of the invention, the fastener 21 is configured to provide at least three points of contact with the spherical surface 26 of the housing 24 when the fastener 21 is engaged with the third threaded portion 40 of the valve stem 30.

While the fastener 21 may have any suitable configuration, in the embodiment shown in FIGS. 1–3, the fastener 21 includes a threaded base portion 48 that is engageable with the third threaded portion 40 of the valve stem 30. The base portion 48 has an axis 49 that is generally coincident with the axis 32 of the valve stem 30 when the fastener 21 is engaged with the valve stem 30.

In the embodiment shown in the Figures, the base portion 48 has a generally rectangular shape, such as a square shape, with generally flat sides. Furthermore, the sides of the base portion 48 are engageable with walls of the pocket 25 such that rotation of the fastener 21 is inhibited when the fastener 21 is engaged with the valve stem 30.

Referring to FIG. 3, the fastener 21 further includes multiple first engaging members, such as multiple spaced apart first projections 50, that extend from a first end 52 of the base portion 48, and multiple second engaging members, such as multiple spaced apart second projections 54, that extend from a second end 56 of the base portion 48. With such a configuration, the fastener 21 may be positioned with either end 52 or 56 facing toward the spherical surface 26 of the housing 24, such that either the first projections 50 or the second projections 54 engage the spherical surface 26.

In the embodiment shown in FIG. 3, each projection 50 and 54 has an engaging surface, such as a spherical surface 58, that is engageable with the spherical surface 26 of the housing 24. The spherical surfaces 58 of the first projections 50 cooperate to provide multiple first points of contact, such as at least three first points of contact, with the spherical surface 26 when the first end 52 of the base portion 48 is facing toward the spherical surface 26 and the fastener 21 is engaged with the third threaded portion 40 of the valve stem 30. Although the fastener 21 is shown with four first projections 50 that may each provide a first point of contact such that the fastener 21 may provide four first points of contact with the spherical surface 26, it may be that only three of the first projections 50 are able to contact the spherical surface 26 at any one time, due to manufacturing tolerances and/or other factors. Furthermore, referring to FIG. 3, the fastener 21 may be configured such the first points of contact lie generally in a plane 60 that is generally perpendicular to the axis 32 of the valve stem 30 and the axis 49 of the fastener 21 when the first projections 50 are engaged with the spherical surface 26 of the housing 24.

Similarly, the spherical surfaces 58 of the second projections 54 are configured to provide multiple second points of contact, such as at least three second points of contact, with the spherical surface 26 of the housing 24 when the second end 56 of the base portion 48 is facing toward the spherical surface 26 and the fastener 21 is engaged with the third threaded portion 40 of the valve stem 30. Although the fastener 21 is shown with four second projections 54 that may each provide a second point of contact such that the fastener 21 may provide four second points of contact with the spherical surface 26, it may be that only three of the second projections 54 are able to contact the spherical surface 26 at any one time, due to manufacturing tolerances and/or other factors. Furthermore, the fastener 21 may be configured such the second points of contact lie generally in a plane that is generally perpendicular to the axis 32 of the valve stem 30 and the axis 49 of the fastener 21 when the second projections 54 are engaged with the spherical surface 26 of the housing 24.

Alternatively, each projection 50 and 54 may include an engaging surface having any suitable configuration for engaging the spherical surface 26 to provide contact, such as a point of contact, between the projection 50, 54 and the spherical surface 26. For example, referring to FIG. 4, each projection 50 and 54 may have a concical surface 58' (only one first projection 50 is shown in FIG. 4), or other concave surface. As another example, referring to FIG. 5, each projection 50 and 54 may have a generally flat, sloped surface 58'' (only one first projection 50 is shown in FIG. 5). As yet another example, each projection 50 and 54 may have a convex surface.

Returning to FIG. 1, the apparatus 10 may further include an additional fastener, such as threaded nut 62, that is engageable with the second threaded portion 38 of the valve stem 30 and the wheel 12. In the embodiment shown in FIG. 1, the nut 62 functions to secure the valve stem 30 to the wheel 12. A seal 64 may also be positioned between the wheel 12 and the valve stem 30 to inhibit passage of air around the valve stem 30.

The apparatus 10 may be assembled together and mounted on the wheel 12 in any suitable manner. For example, referring to FIG. 1, the third threaded portion 40 of the valve stem 30 may be inserted through the second opening 28 of the housing 24, and the fastener 21 may be positioned on the third threaded portion 40. Next, the valve stem 30 may be rotated to thread the third threaded portion 40 through the fastener 21. Referring to FIG. 2, the sides of the base portion 48 of the fastener 21 may engage walls of the pocket 25 of the housing 24 such that rotation, of the fastener 21 is inhibited when the valve stem 30 is rotated.

Next, the seal 64 may be positioned around the valve stem 30, and the valve stem 30 may then be inserted into the first opening 16 of the wheel 12 such that the first and second threaded portions 36 and 38, respectively, extend beyond an exterior surface of the wheel 12. Advantageously, the angular orientation of the valve stem 30 may be adjusted with respect to the housing 24 so that the valve assembly 20 and housing 24 may conform to various wheel configurations. For example, the valve stem 30 may be pivoted with respect to the housing 24 such that the end of the valve stem 30 disposed outside of the wheel 12 may move upwardly or downwardly with respect to the position shown in FIG. 1. Once a desired orientation is achieved, the valve stem 30 may be rotated to tighten the fastener 21 against the spherical surface 26 to thereby fixedly secure together the tire monitor 18 and the valve assembly 20. The nut 62 may then be threaded onto the second threaded portion 38 of the valve stem 30 to secure tire monitor 18 and valve assembly 20 to the wheel 12.

As another example, the valve stem 30 may be inserted into the first opening 16 of the wheel 12 prior to attaching the tire monitor 18 to the valve stem 30. Next, the tire monitor 18 may be attached to the valve stem 30 using the fastener 21, and the nut 62 may be attached to the valve stem 30 to secure the apparatus 10 to the wheel 12.

With the configuration of the fastener 21 described above, the fastener 21 may be positioned on the valve stem 30 such that either end 52 or 56 faces toward the spherical surface 26. Furthermore, the fastener 21 may provide at least three points of contact with the spherical surface 26 regardless of the angular orientation of the valve stem 30 relative to the housing 24. Moreover, the points of contact may lie in a plane that is generally perpendicular to the axis 49 of the fastener 21 such that the fastener 21 functions to align the axes 32 and 49 when the fastener 21 is engaged with the spherical surface 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tire monitoring apparatus for mounting on a vehicle wheel that is configured to have a tire mounted thereon, the wheel having an opening, the apparatus comprising:

a tire monitor for monitoring a tire parameter, the tire monitor having a housing with a spherical surface, the housing further having an opening that extends through the spherical surface;

a tire valve stem that is configured to extend through the opening in the wheel and the opening in the housing, the valve stem having a threaded portion; and a threaded fastener that is engageable with the threaded portion of the valve stem for attaching together the tire monitor and the valve stem, the fastener having a spherical surface that engages the spherical surface of the housing when the fastener is engaged with the threaded portion of the valve stem.

2. The apparatus of claim 1 wherein the fastener has a base portion and multiple spaced apart projections extending from the base portion, each projection having a spherical surface that is engageable with the spherical surface of the housing when the fastener is engaged with the threaded portion of the valve stem.

3. The apparatus of claim 2 wherein the multiple spaced apart projections include three projections.

4. The apparatus of claim 2 wherein the multiple spaced apart projections include four projections.

5. The apparatus of claim 2 wherein the projections cooperate to provide at least three points of contact with the spherical surface of the housing when the fastener is engaged with the threaded portion of the valve stem.

6. The apparatus of claim 5 wherein the points of contact lie generally in a plane that is generally perpendicular to an axis extending through the fastener and the valve stem when the fastener is engaged with the threaded portion of the valve stem.

7. The apparatus of claim 1 wherein the fastener includes a base portion having first and second ends, multiple spaced apart first projections extending from the first end of the base portion, and multiple spaced apart second projections extending from the second end of the base portion, each projection having a spherical surface, the spherical surfaces of the first projections being engageable with the spherical surface of the housing when the first end of the base portion of the fastener is facing toward the spherical surface of the housing and the fastener is engaged with the threaded portion of the valve stem, the spherical surfaces of the second projections being engageable with the spherical surface of the housing when the second end of the base portion of the fastener is facing toward the spherical surface of the housing and the fastener is engaged with the threaded portion of the valve stem.

8. The apparatus of claim 7 wherein the fastener includes three first projections and three second projections.

9. The apparatus of claim 7 wherein the fastener includes four first projections and four second projections.

10. The apparatus of claim 7 wherein the first projections cooperate to provide at least three points of contact with the spherical surface of the housing when the first end of the base portion of the fastener is facing toward the spherical surface of the housing and the fastener is engaged with the threaded portion of the valve stem.

11. The apparatus of claim 10 wherein the points of contact lie generally in a plane that is generally perpendicular to an axis extending through the fastener and the valve stem when the fastener is engaged with the threaded portion of the valve stem.

12. A tire monitoring apparatus for mounting on a vehicle wheel that is configured to have a tire mounted thereon, the wheel having an opening, the apparatus comprising:

a tire monitor for sensing pressure in the tire, the tire monitor having a housing with a spherical surface, the housing further having an opening that extends through the spherical surface;

a tire inflator valve assembly that is configured to extend through the opening in the wheel and the opening in the housing, the valve assembly having a longitudinal axis and a threaded portion; and a threaded fastener that is engageable with the threaded portion of the valve assembly for attaching together the tire monitor and the valve assembly, the fastener including a base portion having first and second ends, the fastener further including multiple spaced apart first projections extending from the first end of the base portion, and multiple spaced apart second projections extending from the second end of the base portion, each projection having a spherical surface, wherein the spherical surfaces of the first projections are configured to provide at least three first points of contact with the spherical surface of the housing when the first end of the base portion of the fastener is facing toward the spherical surface of the housing and the fastener is engaged with the threaded portion of the valve assembly, such that the first points of contact lie generally in a plane that is generally perpendicular to the axis of the valve assembly, and wherein the spherical surfaces of the second projections are configured to provide at least three second points of contact with the spherical surface of the housing when the second end of the base portion of the fastener is facing toward the spherical surface of the housing and the fastener is engaged with the threaded portion of the valve assembly, such that the second points of contact lie generally in a plane that is generally perpendicular to the axis of the valve assembly.

13. A tire monitoring apparatus for mounting on a vehicle wheel that is configured to have a tire mounted thereon, the wheel having an opening, the apparatus comprising:

a tire monitor for monitoring a tire parameter, the tire monitor having a housing with a spherical surface, the housing further having an opening that extends through the spherical surface;

a tire valve stem that is configured to extend through the opening in the wheel and the opening in the housing, the valve stem having a threaded portion; and a threaded fastener that is engageable with the threaded portion of the valve stem and the spherical surface of the housing for attaching together the tire monitor and the valve stem, the fastener having a configuration that provides at least three points of contact with the spherical surface of the housing when the fastener is engaged with the spherical surface of the housing.

14. The apparatus of claim 13 wherein the fastener has at least three engaging members that are engageable with the spherical surface of the housing to provide the at least three points of contact.

15. The apparatus of claim 14 wherein each engaging member has a spherical surface that is engageable with the spherical surface of the housing.

16. The apparatus of claim 14 wherein each engaging member has a conical surface that is engageable with the spherical surface of the housing.

17. The apparatus of claim 14 wherein each engaging member has a substantially flat surface that is engageable with the spherical surface of the housing.

18. The apparatus of claim 13 wherein the fastener includes a base portion having first and second ends, multiple spaced apart first projections extending from the first end of the base portion, and multiple spaced apart second projections extending from the second end of the base portion, each projection having an engaging surface that is engageable with the spherical surface of the housing, the engaging surfaces of the first projections being configured to provide the at least three points of contact with the spherical surface of the housing when the first end of the base portion of the fastener is facing toward the spherical surface of the housing and the fastener is engaged with the threaded portion of the valve stem, the engaging surfaces of the second projections being configured to provide at least three additional points of contact with the spherical surface of the housing when the second end of the base portion of the fastener is facing toward the spherical surface of the housing and the fastener is engaged with the threaded portion of the valve stem.

19. The apparatus of claim 18 wherein each engaging surface comprises a conical surface that is engageable with the spherical surface of the housing.

20. The apparatus of claim 18 wherein each engaging surface comprises a substantially flat surface that is engageable with the spherical surface of the housing.

* * * * *

UNITED STATES PATENT AND TRADEMARK OFFICE
CERTIFICATE OF CORRECTION

PATENT NO. : 6,945,104 B2
DATED : September 20, 2005
INVENTOR(S) : Michael A. Uleski It is certified that error appears in the above-identified patent and that said Letters Patent is hereby corrected as shown below:

Column 5,
Line 63, before "portion" delete "abase" and insert therefor -- a base --.

Signed and Sealed this

Thirteenth Day of December, 2005

JON W. DUDAS
*Director of the United States Patent and Trademark Office*